United States Patent
Kawakami et al.

(10) Patent No.: US 9,539,682 B2
(45) Date of Patent: Jan. 10, 2017

(54) POWER TOOL HAVING IMPROVED TOOL ACCESSORY SECURING MECHANISM

(71) Applicant: MAKITA CORPORATION, Anjo-Shi (JP)

(72) Inventors: Takahiro Kawakami, Anjo (JP); Shin Nakamura, Anjo (JP); Masatoshi Nakahama, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 189 days.

(21) Appl. No.: 14/146,120

(22) Filed: Jan. 2, 2014

(65) Prior Publication Data

US 2014/0191481 A1    Jul. 10, 2014

(30) Foreign Application Priority Data

Jan. 7, 2013   (JP) ................................. 2013-000690

(51) Int. Cl.
    *B23B 31/10*       (2006.01)
    *B23Q 3/14*        (2006.01)
    (Continued)

(52) U.S. Cl.
    CPC .............. *B23Q 3/14* (2013.01); *B23D 61/006* (2013.01); *B24B 23/04* (2013.01); *B24B 45/006* (2013.01);
    (Continued)

(58) Field of Classification Search
    CPC .......... B23B 31/10; B27B 19/006; B27B 5/32; B27B 5/30; B24B 23/04; B24B 23/02; B24B 45/006; Y10T 279/33; Y10T 83/9457; Y10T 83/7045; Y10T 83/9319; B23D 61/006; B25F 3/00; B25F 5/00
    See application file for complete search history.

(56) References Cited

U.S. PATENT DOCUMENTS

| | | | | |
|---|---|---|---|---|
| 4,575,937 A | * | 3/1986 | McCullough | ......... B26B 25/002 |
| | | | | 30/276 |
| 4,597,227 A | | 7/1986 | Gentischer et al. | |

(Continued)

FOREIGN PATENT DOCUMENTS

| | | |
|---|---|---|
| DE | 102005047400 B | 12/2006 |
| DE | 102005047402 A1 * | 4/2007 ........... B24B 23/022 |

(Continued)

OTHER PUBLICATIONS

Machine english translation of Stimpel, "Rotary, oscillating or reciprocating powered tool device, has rod and clamp body exerting clamping force to clamp flange-shaped section against inner wall of sleeve-shaped body to keep tool in retainer in assembling position", German patent DE 102005047402, Apr. 2007.*

(Continued)

*Primary Examiner* — Eric A Gates
*Assistant Examiner* — Chwen-Wei Su
(74) *Attorney, Agent, or Firm* — J-Tek Law PLLC; Jeffrey Tekanic; Scott Wakeman

(57) ABSTRACT

A power tool includes a clamp shaft for clamping a tool accessory to the power tool and a clamp shaft holding mechanism for selectively locking the clamp shaft to hold the clamp shaft in a position that secures the tool accessory on the power tool. The power tool also includes a lever for shifting the clamp shaft holding mechanism between clamped and unclamped states. The lever is configured such that when an operator grasps the lever and moves it toward a position for releasing the tool accessory, the lever and the operator's hand move away from the tool accessory.

1 Claim, 13 Drawing Sheets

(51) Int. Cl.
 *B24B 23/04* (2006.01)
 *B23D 61/00* (2006.01)
 *B24B 45/00* (2006.01)
 *B27B 5/32* (2006.01)
 *B27B 19/00* (2006.01)

(52) U.S. Cl.
 CPC .............. *B27B 5/32* (2013.01); *B23B 31/10* (2013.01); *B27B 19/006* (2013.01); *Y10T 279/33* (2015.01); *Y10T 279/34* (2015.01)

(56) References Cited

U.S. PATENT DOCUMENTS

| | | | |
|---|---|---|---|
| 4,989,374 A | 2/1991 | Rudolf et al. | |
| 5,601,483 A * | 2/1997 | Rudolf | B24B 23/022 |
| | | | 451/342 |
| 6,321,622 B1 | 11/2001 | Tsuge et al. | |
| 6,860,792 B2 | 3/2005 | Krondorfer et al. | |
| 6,949,110 B2 * | 9/2005 | Ark | A61B 17/14 |
| | | | 173/217 |
| 2002/0035882 A1 | 3/2002 | Hartmann | |
| 2002/0170408 A1 | 11/2002 | Hartmann et al. | |
| 2006/0172669 A1 * | 8/2006 | Hesse | B24B 23/028 |
| | | | 451/359 |
| 2007/0060030 A1 | 3/2007 | Pollak et al. | |
| 2010/0047036 A1 | 2/2010 | Hirabayashi et al. | |
| 2010/0197208 A1 * | 8/2010 | Blickle | B24B 23/02 |
| | | | 451/342 |
| 2011/0266759 A1 * | 11/2011 | Goldman | B24B 23/04 |
| | | | 279/106 |
| 2013/0104719 A1 * | 5/2013 | Rubens | B27B 19/006 |
| | | | 83/835 |
| 2013/0193655 A1 * | 8/2013 | Kaye, Jr. | B27B 19/006 |
| | | | 279/141 |
| 2014/0084552 A1 * | 3/2014 | Zieger | B24B 23/022 |
| | | | 279/141 |

FOREIGN PATENT DOCUMENTS

| | | |
|---|---|---|
| EP | 1182019 A | 2/2002 |
| JP | S62181901 A | 8/1987 |
| JP | S63173802 U | 11/1988 |
| JP | 2000167785 A | 6/2000 |
| JP | 2002126944 A | 5/2002 |
| JP | 2003025145 A | 1/2003 |
| JP | 2004351538 A | 12/2004 |
| JP | 2008238321 A | 10/2008 |
| WO | 2005102605 A | 11/2005 |
| WO | WO2012167850 A1 * | 12/2012 |

OTHER PUBLICATIONS

Extended European Search Report mailed Apr. 22, 2014, including European Search Opinion, European Search Report and examined claims 1-14.

Office Action from the Japanese Patent Office mailed May 17, 2016 in related Japanese application No. 2013-000690, and English translation of substantive portions thereof.

* cited by examiner

POWER TOOL HAVING IMPROVED TOOL ACCESSORY SECURING MECHANISM

CROSS-REFERENCE

This application claims priority to Japanese patent application no. 2013-000690 filed on Jan. 7, 2013, the contents of which are fully incorporated herein by reference.

TECHNICAL FIELD

The present disclosure is generally directed to a power tool (work tool), e.g., an oscillating multi-tool, that drives an interposingly held (clamped) tool accessory (tip tool), and, in certain aspects, generally relates to a power tool having an improved clamping arrangement for securing the tool accessory to a pivotable or rotatable spindle.

BACKGROUND ART

PCT International Publication No. WO2005/102605 (see also US2007/060030) describes a hand-held power tool that drives a detachable tool (tool accessory) interposed (clamped) between and held by a work spindle and a fastening element. This power tool is configured such that the fastening element is movable relative to the working spindle between a clamped position and an open or release position. When the fastening element is in the clamped position, the tool is fixedly secured to the work spindle, and when the fastening element is in the open or release position, the tool can be removed or detached from the work spindle. Furthermore, in the clamped position, a clamping shaft of the fastening element is held by a lock assembly inside the work spindle. The tool is held (sandwiched) between the working spindle and the fastening element by a clamping force generated by a spring element provided inside the working spindle.

In the power tool described in WO2005/102605, the fastening element moves from the clamped position to the release position by pivoting a lever toward the side of the tool. That is, in order to operate (pivot) the lever, the user's hand grasps the lever and moves it toward the tool. However, many types of tools (tool accessories) have pointed or sharp edges. Therefore, if the user's hand slips while shifting the level to the release position, it is possible that the user's hand will accidently come into contact with the sharp tool, thereby causing injury. Consequently there is a need in the art to improve the operation of the lever. For example, it would be desirable to provide an improved technology for operating (pivoting) a lever or handle when attaching and detaching a tool accessory of a power tool.

SUMMARY OF THE INVENTION

The aforementioned problem and others are addressed by embodiments of the present disclosure, a first aspect of which involves a power tool comprising a clamp mechanism configured to interposingly hold (sandwich) a tool (also known as a "tip tool" or "tool accessory"), and an operating mechanism configured to operate the clamp mechanism. The power tool is configured to drive the tool while it is interposingly held by the clamp mechanism. The operating mechanism comprises a grasping part (e.g., a pivotable handle, lever or grip) configured to be grasped and manipulated by an operator to operate the clamp mechanism. The operating mechanism is movable, displaceable, switchable or shiftable between a first mode (e.g., a clamped position or configuration) in which the clamp mechanism interposingly holds (e.g., sandwiches or clamps) the tool, and a second mode (e.g., a release position or configuration) in which the tool can be removed (detached) from the clamp mechanism. Furthermore, the power tool is configured such that the operating mechanism can be switched, moved, displaced, or shifted from the first mode to the second mode by moving the grasping part in a direction moving away from the tool. The first mode is a clamped state in which the clamp mechanism interposingly holds the tool in a fixed manner, and the second mode is an unclamped state in which the tool can be removed from the clamp mechanism.

According to some embodiments of the present disclosure, in order to remove or detach the tool, the grasping part of the operating mechanism is moved in the direction away from the tool. This makes it possible to keep the grasping part and the hand of the operator that is grasping the grasping part away from the tool, thereby reducing the possibility that the operator's hand will accidently come into contact with the sharp tool while the tool is being released. Namely, techniques for improving the operating mechanism, e.g., the safety thereof, are disclosed herein.

According to another embodiment of the present disclosure, the clamp mechanism optionally comprises an urging member (e.g., a spring and/or an elastic material) and is configured such that the tool is interposingly held (clamped) by an urging (biasing or spring) force of the urging member. Furthermore, the clamp mechanism operates when the grasping part is moved against the urging force to switch the operating mechanism from the first mode to the second mode.

When the tool is being removed in such an embodiment, the grasping part must be moved against the urging force of the urging member, and consequently a relatively large force is needed to move the grasping part. Therefore, if the user's hand were to possibly slip during this movement, the user's hand will be moving in the direction away from the tool and thus will be less likely to accidently come into contact with the sharp tool and injure the operator. Accordingly, when the tool is being removed, the grasping part and the hand of the operator that is grasping the grasping part are kept away from the tool due to the presently-disclosed design of the operating mechanism.

According to another embodiment of present disclosure, the grasping part is optionally configured such that it is capable of moving between a first position and a second position. Furthermore, the operating mechanism is optionally configured such that the clamp mechanism operates by moving the grasping part from the first position to the second position, thereby switching (changing) the operating mechanism from the first mode to the second mode. The grasping part is spaced farther from the tool in the second position than in the first position. Consequently, when the tip tool is being removed in such an embodiment, the grasping part and the hand of the operator that is grasping the grasping part can be kept safely away from the tool.

According to another embodiment of the present disclosure, the operating mechanism is optionally configured such that the grasping part is pivotable about a fulcrum. Furthermore, the first position is located on side of the fulcrum that is closest to the tool, and the second position is located on the side of the fulcrum opposite of or most remote (farthest) from the tool. Consequently, when the tip tool is being removed in such an embodiment, the grasping part and the hand of the operator that is grasping the grasping part can be kept safely away from the sharp tool.

According to another embodiment of the present disclosure, the grasping part is optionally configured such that it is movable from the first position to a third position, which differs from the second position. Furthermore, the grasping part is optionally configured such that it is fixed or secured to a power tool main body at the third position. The grasping part optionally may contact or optionally need not contact the power tool main body in the third position.

Because the grasping part is fixed or secured to the power tool main body at the third position in this embodiment, it is possible to prevent the grasping part from moving or separating from the power tool when the power tool vibrates during operation. In addition or in the alternative, the third position can be used as a stored position of the grasping part.

According to another embodiment of the present disclosure, the grasping part is optionally configured such that it is fixed or secured to the power tool main body at the third position by an elastic force of one or more elastic members. The elastic member(s) preferably include(s) a resilient element, a rubber member, a spring, and/or the like attached to the power tool main body, the grasping part, or a component coupled thereto. This embodiment may make it possible to more effectively prevent or suppress the grasping part from being moved by the vibrations of the power tool during operation.

According to another embodiment of the present disclosure, the grasping part optionally comprises a first portion and (two or more) second portions respectively arranged such that when the grasping part is located at the third position, the distance between the first portion and the power tool main body is shorter than the distance between the second portions and the power tool main body. As an exemplary embodiment thereof, recessed parts formed in the grasping part may serve as the second portions of the grasping part. In addition, protruding parts may be formed in the first portion of the grasping part and may be shaped to make contact with the power tool main body. In the alternative, protruding parts may be formed in the portion of the power tool main body corresponding to the first portion of the grasping part and the protruding parts and the first portion may be shaped to make contact.

According to this embodiment, when the grasping part is located at the third position, the operator can easily grasp the grasping part by inserting (disposing) his or her fingers between the respective second portions and the power tool main body. In this manner, the grasping part, when grasped at the second portions, can be moved from the third position to the first position.

According to another embodiment of the present disclosure, the grasping part is optionally configured such that it moves from the first position to the second position by moving in a first direction. In this case, the grasping part is preferably configured such that it moves from the first position to the third position by moving in a second direction, which is different from the first direction. For example, the second direction may be perpendicular or at least substantially perpendicular to the first direction. By making the first direction different from the second direction in this embodiment, it is possible to reliably differentiate between (i) the movement of the grasping part in order to switch between the first mode and the second mode and (ii) the movement of the grasping part to the third position in order to store the grasping part. As a result, it is possible to provide a power tool that has a rational or sensible configuration with respect to the movement of the grasping part.

According to another embodiment of the present disclosure, the grasping part is optionally configured such that it moves from the first position to the third position by sliding along the second direction. By sliding the grasping part along the second direction in this embodiment, the grasping part moves to the third position, and this makes it possible to more reliably differentiate between (i) the movement of the grasping part in order to switch between the first mode and the second mode and (ii) the movement of the grasping part to the third position in order to store the grasping part.

According to another embodiment of the present disclosure, the grasping part is optionally configured such that it moves from the first position to the second position by pivoting in the first direction. In this case, the grasping part is preferably configured such that it moves from the first position to the third position by pivoting in the second direction.

According to such an embodiment, a configuration may be adopted such that the grasping part is pivotable in two different directions. This makes it possible to more reliably differentiate between (i) the movement of the grasping part in order to switch between the first mode and the second mode and (ii) the movement of the grasping part to the third position in order to store the grasping part.

DETAILED DESCRIPTION OF EMBODIMENTS (First Embodiment)

A first embodiment of the present disclosure will now be explained in detail, referencing FIG. 1 through FIG. 7. The explanation below is directed to a power tool in the form of a so-called oscillating multi-tool.

Figure 1:
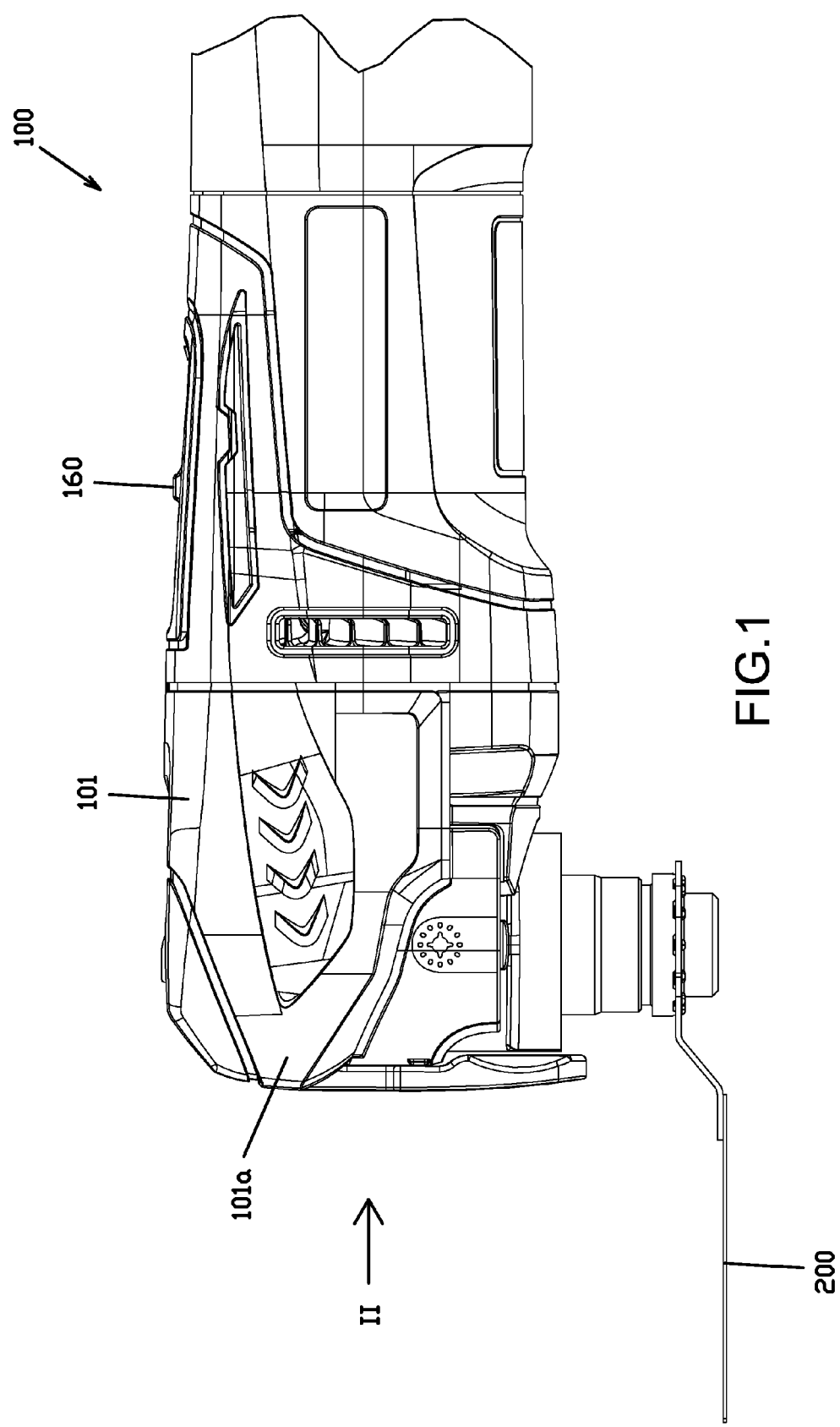
FIG. 1 is a partial side view of an oscillating multi-tool (power tool) according to a first embodiment of the present disclosure.

As shown in FIG. 1, an oscillating multi-tool 100 is type of a power tool, to which various tools (e.g., tool accessories or tool attachments), such as (without limitation) saw blades, scrapers, scraper plates, files, sand paper pads and polishing pads, can be selectively (interchangeably) attached. The multi-tool causes the attached tool to oscillate about a small pivot angle or range (e.g. 3.2°) in order to cut, grind, or otherwise act on (process) a work piece. The embodiment below uses a plunge cut saw blade 200 as one representative example of a detachable (clampable) tool, tool accessory or tool attachment (tip tool) according to the present teachings.

Figure 2:
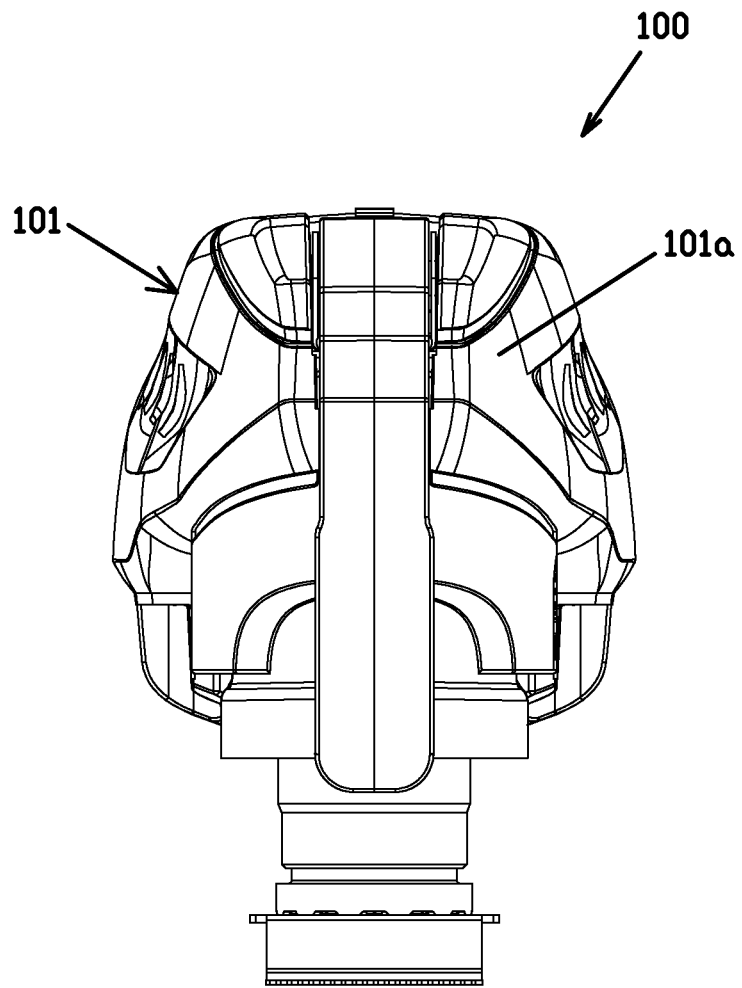
FIG. 2 is a front view of the multi-tool taken in the direction of arrow II in FIG. 1.
Figure 3:
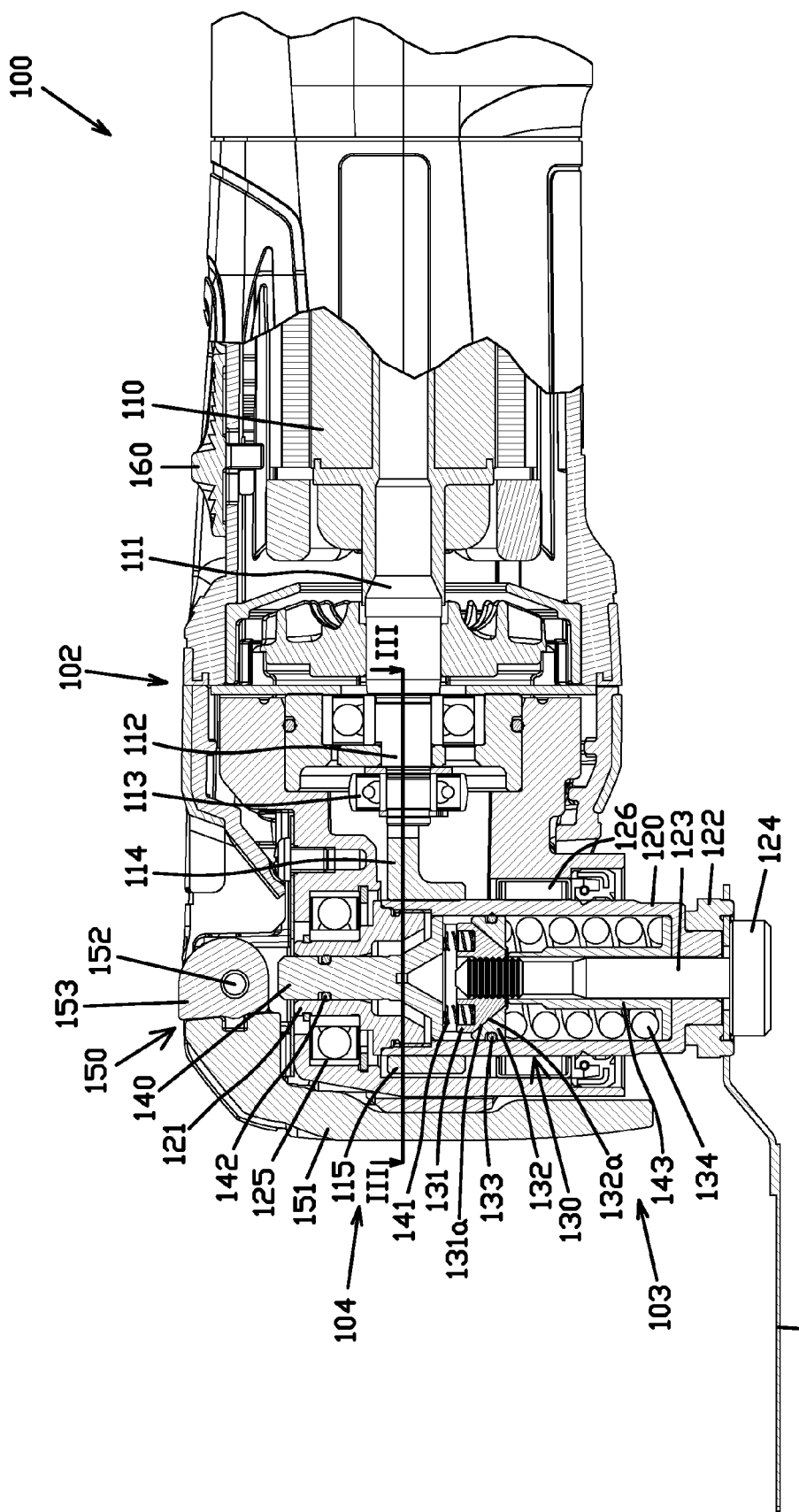
FIG. 3 is a cross sectional view through the multi-tool of FIG. 1.

As shown in FIG. 1 and FIG. 2, the outer contour or shape of the multi-tool 100 is formed by a main body housing 101. At least one protective rubber member 101a for protecting the multi-tool 100 is disposed on a surface of the main body housing 101. In addition, as shown in FIG. 1, a switch 160 for switching the drive state of the multi-tool 100 is provided on an upper surface of the main body housing 101. As shown in FIG. 3, a drive mechanism 102, a tool holding mechanism 103, and a tool hold releasing mechanism 104 are housed (contained) in the main body housing 101. The main body housing 101 is one exemplary, non-limiting embodiment of a "power tool main body" according to the present disclosure.

Figure 4:
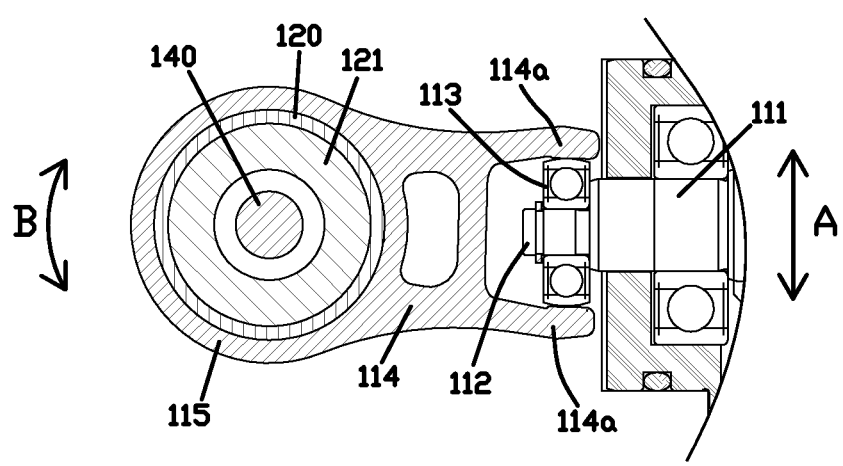
FIG. 4 is a partial cross sectional view taken along line III-III in FIG. 3.
Figure 5:
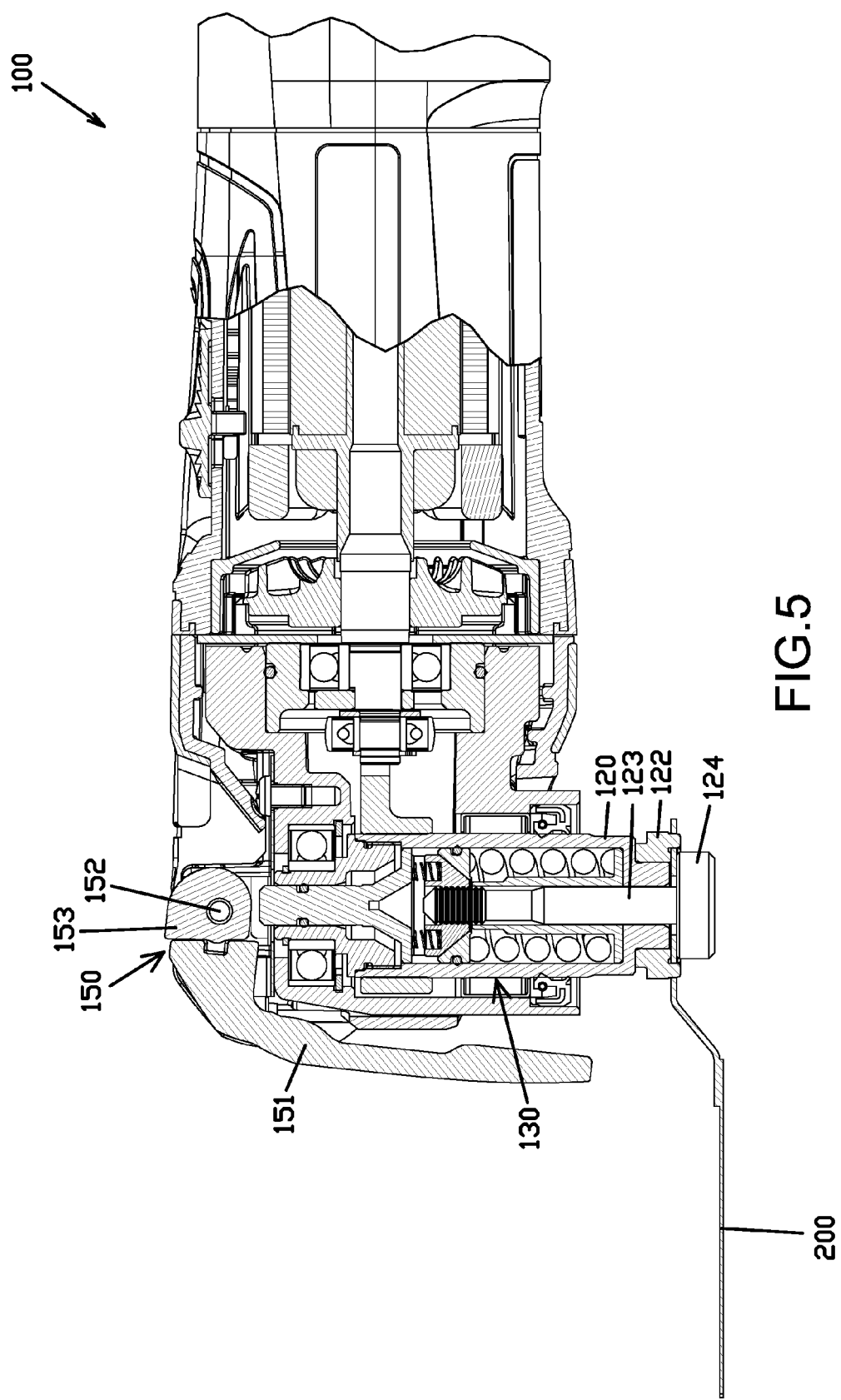
FIG. 5 is a cross sectional view of the multi-tool with a cam lever in a clamped position.
Figure 6:
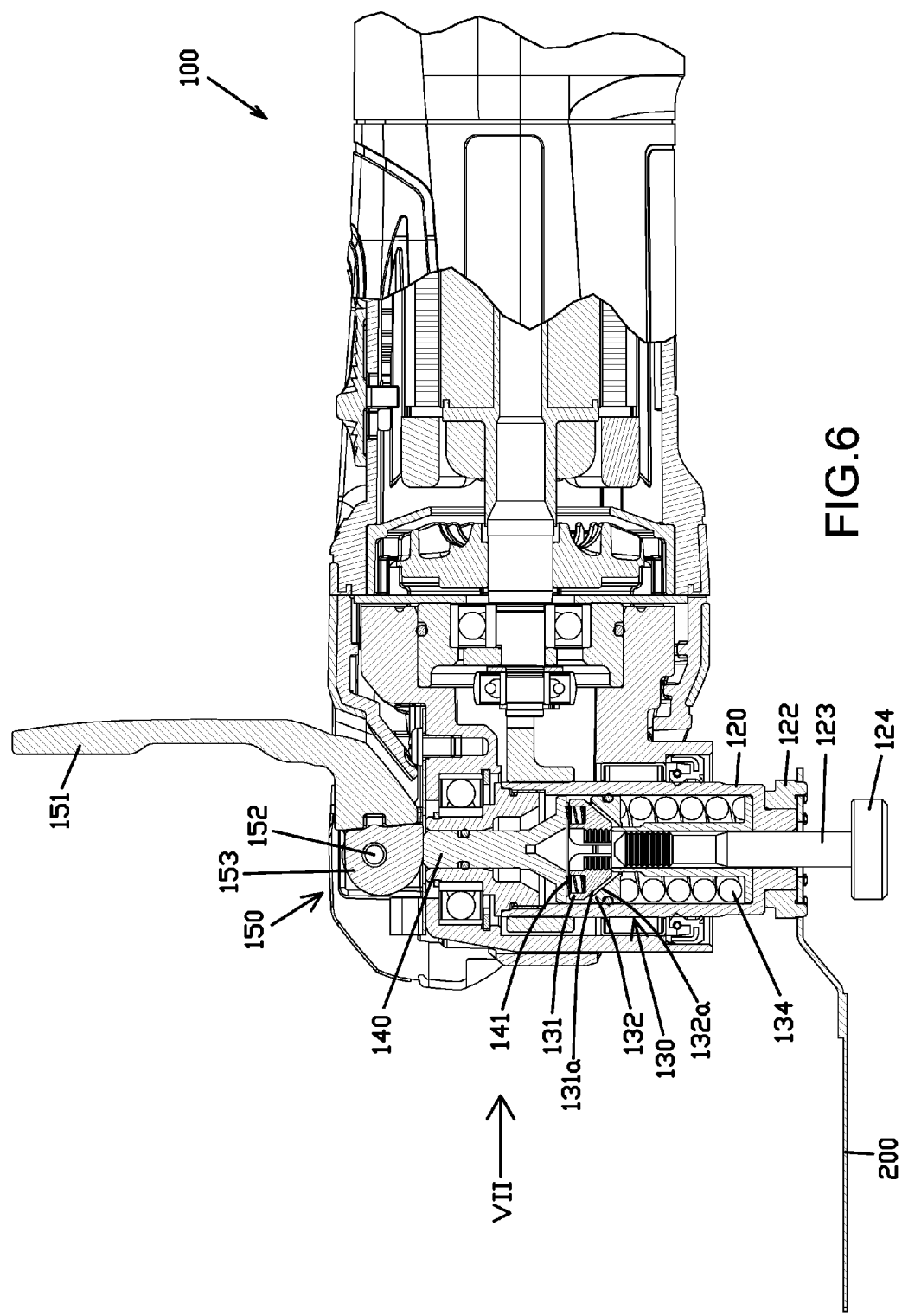
FIG. 6 is a cross sectional view of the multi-tool of FIG. 5 with the cam lever in a release position.

As shown in FIG. 3, the drive mechanism 102 principally comprises a motor 110, an eccentric shaft 112, a bearing 113, a driven arm 114, and a spindle connecting part 115. The eccentric shaft 112 is disposed at a tip of an output shaft 111 of the motor 110 such that the eccentric shaft 112 extends in directions parallel to the rotational axis of the output shaft 111. The eccentric shaft 112 is disposed at a position that is eccentric with respect to the rotational axis of the output shaft 111. The bearing 113 is attached to the eccentric shaft 112. The driven arm 114 comprises two arm parts 114a that extend from the spindle connecting part 115 toward the motor 110 as shown in FIG. 4. Furthermore, the driven arm 114 is disposed such that the two arm parts 114a contact the bearing 113 at two locations opposing the outer side of the bearing 113. For clarity of illustration, the main body housing 101 is not shown in FIG. 4.

As shown in FIG. 3, the tool holding mechanism 103 is a mechanism that both holds the blade 200 and oscillates the blade 200 by transmitting the output of the motor 110 to the blade 200. The tool holding mechanism 103 principally comprises a spindle 120, a spindle extension member 121, a clamp shaft 123, and a clamp shaft holding mechanism 130.

The spindle 120 is a hollow circular cylindrical member, e.g., a cylindrical tube, and is disposed such that its longitudinal axis extends in a direction that intersects the longitudinal axes of the output shafts 111 of the motor 110. The spindle 120 and the spindle extension member 121 are integrally coupled and are supported at two locations in the longitudinal directions thereof by the main body housing 101 via bearings 125,126, such that they are capable of rotating around their respective longitudinal directions. A flange 122 is attached to a tip part of the spindle 120.

The clamp shaft 123 is an at least substantially circular columnar member, e.g., a cylindrical pin. The clamp shaft 123 comprises a clamp head 124 that is formed integrally with one end part of the clamp shaft 123. In addition, at another (opposite) end part, the clamp shaft 123 has a plurality of engaging grooves that extend circumferentially and are engageable with one or more clamp members 131. The clamp shaft 123 is disposed inside the spindle 120 and parallel to the longitudinal directions of the spindle 120 and such that the clamp shaft 123 is capable of sliding in the longitudinal directions along the inner side of the spindle 120.

As shown in FIG. 3, the clamp shaft holding mechanism 130 is configured such that it holds the end part of the clamp shaft 123 on the opposite side to the clamp head 124 and is disposed inside the spindle 120. The clamp shaft holding mechanism 130 principally comprises the one or more clamp members 131, a ring shaped (annular) member 132, an O-ring 133, and a coil spring 134. The clamp shaft holding mechanism 130 is one exemplary, non-limiting embodiment of a "clamp mechanism" of the present disclosure.

In the present embodiment, two clamp members 131 are disposed at two locations that surround (oppose) the spindle 120 in the circumferential direction thereof. The clamp members 131 are configured so that they are capable of moving along the longitudinal direction of the spindle 120. A plurality of protruding parts, which are capable of engaging with the engaging grooves of the clamp shaft 123, are formed in a surface of each of the clamp members 131 that opposes the clamp shaft 123. In addition, the clamp members 131 each have a tilted (inclined) surface 131a that is tilted (inclined or oblique) with respect to the longitudinal directions of the spindle 120. The tilted surface 131a is configured such that it engages with a tilted surface 132a of the ring shaped member 132.

The ring shaped member 132 is disposed such that it surrounds the respective outer sides of the clamp members 131 in the radial directions of the spindle 120. An outer circumferential part of the ring shaped member 132 extends upward beyond an upper end of the clamp members 131 in the longitudinal direction of the spindle 120. The ring shaped member 132 is configured such that it is capable of moving along the longitudinal direction of the spindle 120. The ring shaped member 132 is formed with a tilted surface 132a that engages with the tilted surfaces 131a of the clamp members 131. In addition, the coil spring 134 is disposed between the ring shaped member 132 and the spindle 120 such that it extends in the longitudinal directions of the spindle 120. The ring shaped member 132 is held by an urging (biasing or spring) force of the coil spring 134 in a state wherein the ring shaped member 132 is urged or biased in one longitudinal direction (i.e. upward) of the spindle 120. Thereby, the tilted surface 132a of the ring shaped member 132 engages with the tilted surfaces 131a of the clamp members 131, and the clamp members 131 are urged radially toward the spindle 120. With this configuration, the engagement of the tilted surfaces 131a of the clamp members 131 and the tilted surface 132a of the ring shaped member 132 causes the clamp members 131 to each move radially against the spindle 120. Consequently, the protruding parts formed in the clamp members 131 engage with the corresponding (opposing) engaging grooves of the clamp shaft 123 such that the clamp members 131 hold the clamp shaft 123 and prevent movement in the axial direction thereof. In addition, the 0-ring 133 is disposed on the outer side of the ring shaped member 132. In this configuration, when the ring shaped member 132 moves in the longitudinal directions of the spindle 120, the 0-ring 133 maintains the attitude or posture of the ring shaped member 132.

In the clamp shaft holding mechanism 130 configured as described above, the engagement of the ring shaped member 132, caused by the urging (biasing) of the coil spring 134, with the tilted surfaces 131a of the clamp members 131 converts the urging force of the coil spring 134 into a force acting in the radial directions of the spindle 120. Thereby, the coil spring 134 urges the clamp members 131 in the radial directions of the spindle 120 to hold the clamp shaft 123. Namely, the clamp shaft 123 is held by the urging force of the coil spring 134. By virtue of the clamp shaft holding mechanism 130 holding the clamp shaft 123 and urging the clamp shaft 123 in the longitudinal directions of the spindle 120, the blade 200 is interposingly held or clamped between the clamp head 124 and the flange 122. Because the clamp head 124 is urged toward the flange 122 while the clamp shaft 123 is held in place, the blade 200 is interposingly held or clamped between the flange 122 and the clamp head 124. The coil spring 134 is one exemplary, non-limiting embodiment of an "urging member" according to the present disclosure.

As shown in FIG. 3, the tool hold releasing mechanism 104 is configured to release the hold of the clamp shaft 123 effected by the clamp shaft holding mechanism 130. Releasing the hold of the clamp shaft 123 makes it possible to attach the blade 200 to, or detach the blade 200 from, between the spindle 120 and the clamp shaft 123. The tool hold releasing mechanism 104 principally comprises a thrust pin 140, coil springs 141, an O-ring 142, an ejector 143, and a cam lever mechanism 150. The tool hold releasing mechanism 104 is one exemplary, non-limiting embodiment of an "operating mechanism" according to the present disclosure.

The thrust pin 140 is mounted so that it is slidable in the longitudinal directions of the spindle 120 on the inner side of the spindle extension member 121. Two of the coil springs 141 are disposed at a lower end part of the thrust pin 140. Each of the coil springs 141 is disposed such that one end contacts the lower end part of the thrust pin 140 and the other end contacts the clamp members 131. In this manner, the coil springs 141 urge the thrust pin 140 upward. At the outer circumference of the thrust pin 140, the O-ring 142 is disposed such that it contacts an inner circumferential surface of the spindle extension member 121. In addition, the substantially circular cylindrical ejector 143 is disposed on the inner side of the spindle 120.

As shown in FIG. 3, the cam lever mechanism 150 is configured to contact the thrust pin 140 and cause (urge) the thrust pin 140 to slide downward along the longitudinal direction of the spindle 120. The cam lever mechanism 150 principally comprises a lever part (pivotable handle) 151, a pivot axle 152, and an eccentric part 153.

The lever part 151 is configured such that it is capable of pivoting about the pivot axle 152 orthogonal to the longitudinal directions of the spindle 120. The eccentric part 153 is capable of contacting the thrust pin 140 and links with (is coupled to) the lever part 151. A center position of the eccentric part 153 is disposed such that it is eccentric with respect to an axial center of the pivot axle 152. Due to being arranged in this manner, the distance from the axial center of the pivot axle 152 differs for each location of the outer circumferential part of the eccentric part 153. The lever part 151 and the pivot axle 152 are exemplary, non-limiting embodiments of a "grasping part" and a "fulcrum," respectively, according to the present disclosure.

As shown in FIGS. 1-3, the lever part 151 is selectively retained on the main body housing 101 in a position (hereinbelow, called a "stored position") such that the lever part 151 extends from the pivot axle 152 toward the blade 200 with a free end of the lever part 151 located closer to the blade 200 than to the pivot axle 152. When the lever part 151 is pivoted from the stored position to the position shown in FIG. 5 (hereinbelow, called a "clamped position"), the lever part 151 in this clamped position becomes capable of moving relative to the main body housing 101. By further pivoting the lever part 151 away from the clamped position and thus towards the position shown in FIG. 6 (hereinbelow, called a "release position"), the eccentric part 153 contacts (increasingly downwardly presses) the thrust pin 140 and causes the thrust pin 140 to move downward. In the release position, the free end of the lever part 151 is spaced farther apart from the blade 200 than in the clamped position. The stored position, the clamped position, and the release position are exemplary, non-limiting embodiments of a "third position," a "first position," and a "second position," respectively, according to the present disclosure.

Figure 7:
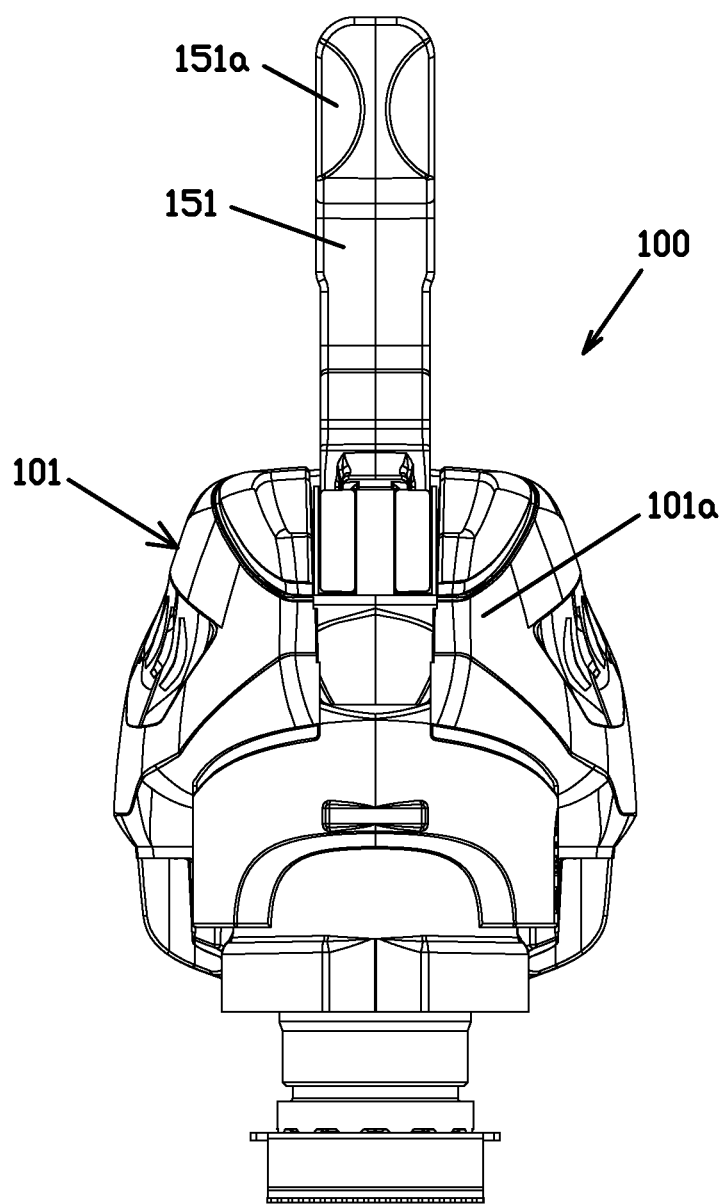
FIG. 7 is another front view taken in the direction of arrow VII in FIG. 6 with the cam lever in the release position.

In the stored position, the lever part 151 is elastically held against the (front) side of the main body housing 110 by the protective rubber members 101a. As shown in FIG. 1 and FIG. 7, two recessed parts 151a are formed in (a rear side of) the lever part 151. These two recessed parts 151a can be grasped by a user's fingers to pull the lever part 151 away from the main body housing 101. Namely, the distance between each of the recessed parts 151a and the main body housing 101 is greater than the distance between the other portion of the lever part 151 and the main body housing 101, and thus the operator can easily dispose (insert) his or her fingers in the recessed parts 151a. The recessed parts 151a are exemplary, non-limiting embodiments of "second portions" according to the present disclosure. Furthermore, the portion of the lever part 151 outside of the recessed parts 151a is one exemplary, non-limiting embodiment of a "first portion" according to the present disclosure.

When the lever part 151 is pivoted from the clamped position toward the release position, the eccentric part 153 (initially) contacts the thrust pin 140 midway toward the release position. Further pivoting of the lever part 151 toward the release position causes the eccentric part 153 to move (press) the thrust pin 140 downward. As the thrust pin 140 slides (moves) downward, a lower end of the thrust pin 140 presses the ring shaped member 132 downward and presses the clamp members 131 downward via the coil springs 141. This moves the clamp members 131 and the ring shaped member 132 downward against the urging force of the coil spring 134. Moving downward in this manner, the clamp members 131 contact the upper end of the ejector 143, and thereby the movement of the clamp members 131 downward is restrained (stopped). Moreover, the downward movement of the ring shaped member 132 causes a gap to be created between the ring shaped member 132 and the clamp members 131, and this terminates (removes) the urging force of the coil spring 134 against the clamp shaft 123. As a result, it becomes possible to remove (detach) the clamp shaft 123 from the spindle 120. Removing the clamp shaft 123 from the spindle 120 makes it possible to remove (detach) the blade 200. In the present clamp shaft holding mechanism 130, the state or configuration in which the clamp shaft 123 can be removed (detached) is also called an "unclamped state" and is one exemplary, non-limiting embodiment of a "second mode" according to the present disclosure.

In order to mount (attach) a different tool (e.g., a different blade or another type of accessory) or also possibly remount (reattach) the same tool (blade 200), the tool (e.g. another blade 200) is first disposed (inserted) between the flange 122 and the clamp head 124, i.e. the clamp shaft 123 is inserted through a hole in the tool (blade 200) and then into the hollow interior of the spindle 120. After the clamp shaft 123 has been inserted into the spindle 120, the lever part 151 of the cam lever mechanism 150 is pivoted (downward) from the release position to the clamped position. When the lever part 151 is pivoted in this direction, the thrust pin 140 and the ring shaped member 132 also move upward as a result of (or due to) the urging force of the coil spring 134. Furthermore, the tilted surface 132a of the ring shaped member 132 then comes into engagement with the tilted surfaces 131a of the clamp members 131, and the urging force of the coil spring 134 is converted into a radial urging force that is directed toward the spindle 120. Thereby, the clamp members 131 are caused to move toward the center of the spindle 120 in the radial directions. As a result, the protruding parts of the clamp members 131 come into engagement with the engaging grooves of the clamp shaft 123 and fixedly hold the clamp shaft 123. At this time, the urging force of the coil spring 134 not only holds the clamp shaft 123 via the clamp members 131 but also moves the held clamp shaft 123 upward, thereby moving the clamp head 124 in an upward direction so that that it approaches the flange 122. As a result, the blade 200 becomes interposingly held or clamped between the flange 122 and the clamp head 124. The state in which the clamp shaft 123 is interposingly held (clamped) in the clamp shaft holding mechanism 130 is called a "clamped state" and is one exemplary, non-limiting embodiment of a "first mode" according to the present disclosure.

After the blade 200 has been mounted (clamped), the lever part 151 is further moved (pivoted) from the clamped position to the stored position, and the lever part 151 is held there by the protective rubber members 101a so as to be secured to the main body housing 101.

In the exemplary multi-tool 100 configured as described above, when the switch 160 is switched to the ON state and the motor 110 is driven, the rotational motion of the output shaft 111 is converted into reciprocating (oscillating) motion in the directions indicated by arrow A (hereinbelow, "A directions") by the eccentric shaft 112 and the bearing 113, as shown in FIG. 4. The reciprocating motion in the A directions is transmitted to the driven arm 114 and is converted into a pivoting motion that has a prescribed oscillating (pivot) angle (e.g., 3.2°) in the circumferential directions around the spindle 120 indicated by an arrow B (hereinbelow, "B directions") and centered on the spindle connecting part 115. Thereby, the spindle 120, which is connected to the spindle connecting part 115, is driven in a reciprocating (oscillating) manner in the B directions. As a result, the blade 200, which is clamped between the flange 122 and the clamp head 124, is oscillated, and can be used to process (e.g., cut, grind, sand, etc.) a work piece.

(Second Embodiment)

Next, a second embodiment of the present disclosure will be explained with reference to FIG. 8 through FIG. 10. The second embodiment differs from the first embodiment principally in the configuration of cam lever mechanism 250. Consequently, constituent elements that are the same as those in the first embodiment have been assigned the same reference numbers, and explanations thereof are therefore omitted where they would be merely repetitive. That is, the description of the first embodiment is incorporated by reference into the description of the second embodiment to the extent that identical or substantially similar elements, functions, configurations, etc. are present in the second embodiment.

Figure 8:
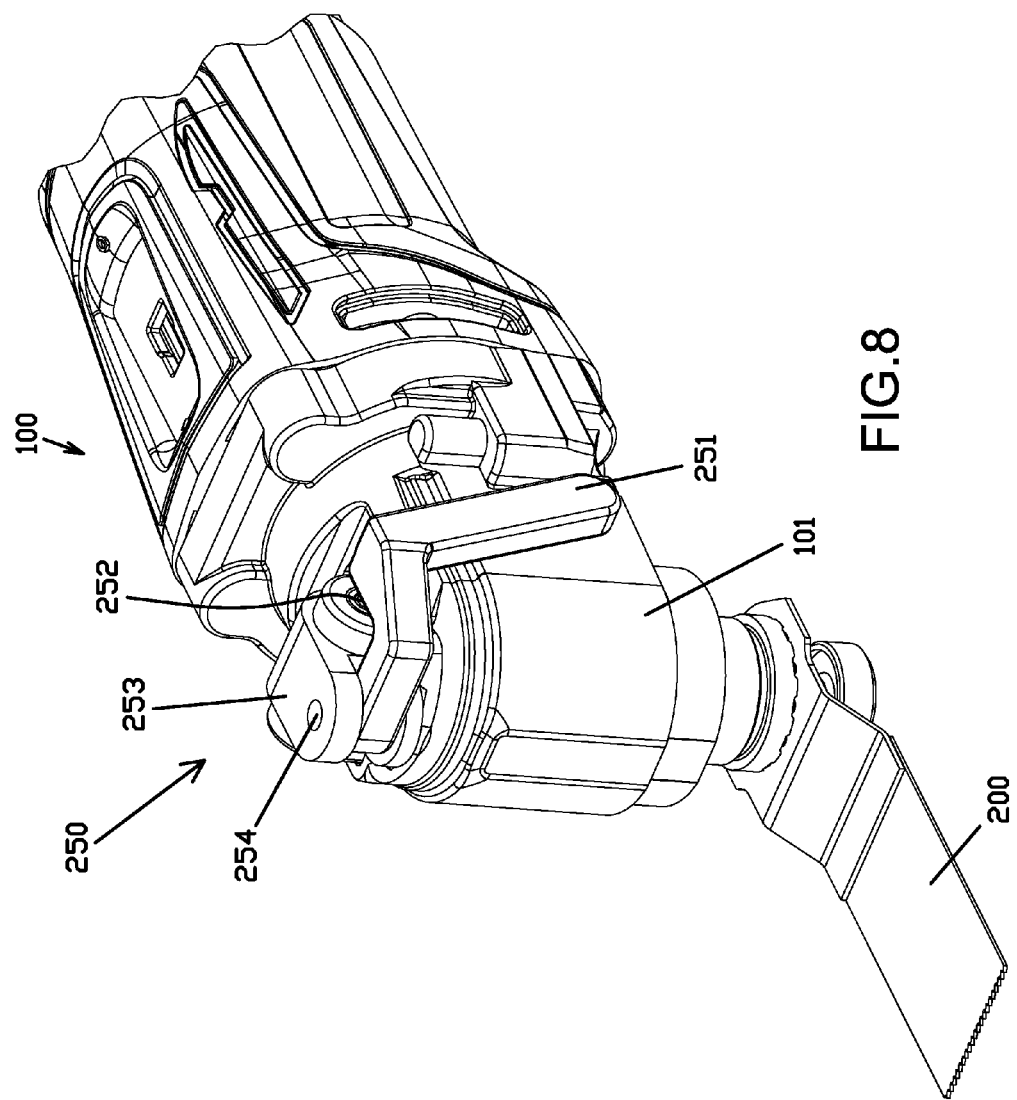
FIG. 8 is an oblique view of an oscillating multi-tool, including a cam lever, according to a second embodiment of the present disclosure.

As shown in FIG. 8, the cam lever mechanism 250 principally comprises a lever part (pivotable handle) 251, a (first) pivot axle 252, an eccentric part 253, and a (second) pivot axle 254.

The lever part 251 is pivotally supported by the (second) pivot axle 254 and is thereby linked to the eccentric part 253 so that it can pivot relative to the eccentric part 253. Namely, the lever part 251 is configured such that it can pivot about the (second) pivot axle 254 from the position shown in FIG. 8 to the position shown in FIG. 9. The lever part 251 and the (first) pivot axle 252 are exemplary, non-limiting embodiments of a "grasping part" and a "fulcrum," respectively, according to the present disclosure. In addition, the position of the lever part 251 shown in FIG. 8 is one exemplary, non-limiting embodiment of a "third position" according to the present disclosure, and the position of the lever part 251 shown in FIG. 9 is one exemplary, non-limiting embodiment of a "first position" according to the present disclosure. In addition, the pivot direction around the (second) pivot axle 254 is one exemplary, non-limiting embodiment of a "second direction" according to the present disclosure.

The eccentric part 253 is supported by the (first) pivot axle 252, which is orthogonal to the longitudinal directions of the spindle 120, and is configured such that it is capable of pivoting about the (first) pivot axle 252. Namely, the eccentric part 253 is configured such that, by pivoting the lever part 251, the eccentric part 253 can pivot about the (first) pivot axle 252 from the position shown in FIG. 9 to the position shown in FIG. 10. The position of the lever part 251 shown in FIG. 10 is one exemplary, non-limiting embodiment of a "second position" according the present disclosure. In addition, the pivot direction around the (first) pivot axle 252 is one exemplary, non-limiting embodiment of a "first direction" according to the present disclosure.

Figure 9:
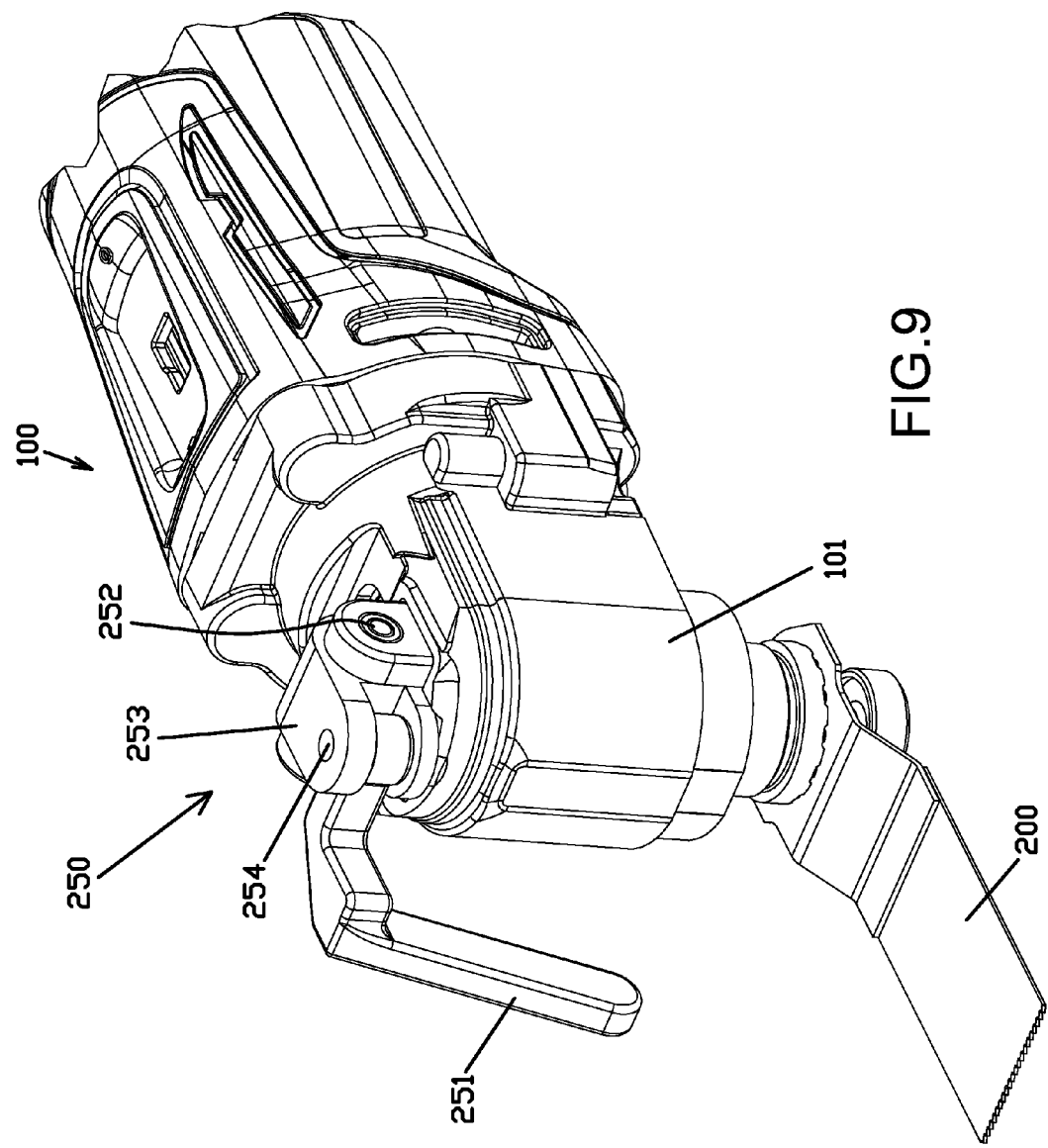
FIG. 9 is an oblique view of the multi-tool of FIG. 8 that shows the cam lever pivoted away from the position shown in FIG. 8.
Figure 10:
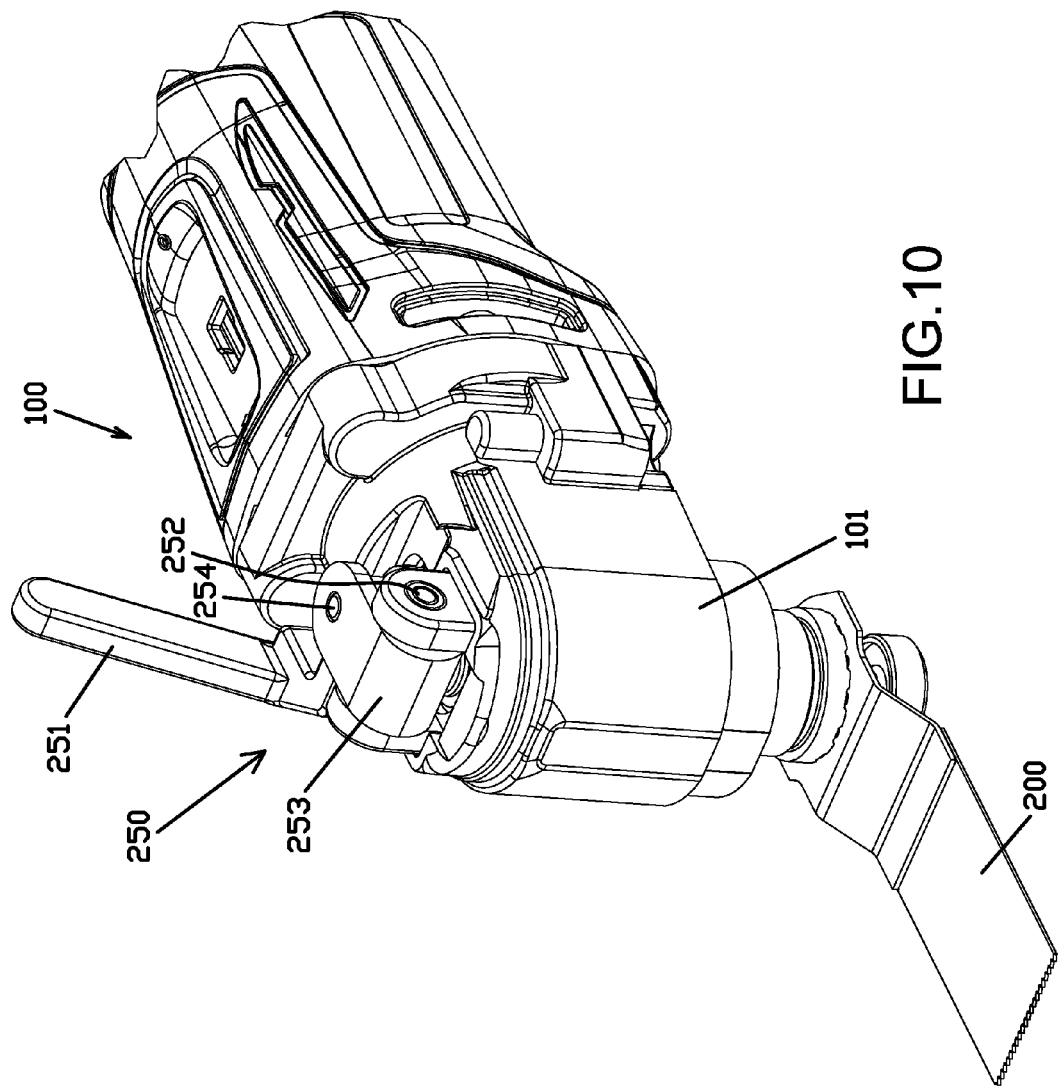
FIG. 10 is an oblique view of the multi-tool of FIG. 9 that shows the cam lever pivoted away from the position shown in FIG. 9.

In the second embodiment, by causing the lever part 251 to pivot from the position shown in FIG. 9 to the position shown in FIG. 10, the eccentric part 253 moves the thrust pin 140 downward and makes it possible to remove (detach) the clamp shaft 123 from the spindle 120; furthermore, by removing the clamp shaft 123, the blade 200 can be removed. When another blade 200 (or another tool accessary) is to be mounted (clamped) again, the lever part 251 is pivoted from the position shown in FIG. 10 to the position shown in FIG. 9. The operation of each constituent element at this time is the same as in the first embodiment. The position shown in FIG. 9 and the position shown in FIG. 10 correspond to the clamped position and the release position, respectively. Namely, in the release position, the free end of the lever part 251 is spaced farther from the blade 200 than it is in the clamped position.

After the blade 200 has been mounted (clamped), the lever part 251 is secured to the main body housing 101 by pivoting the lever part 251 from the position shown in FIG. 9 to the position shown in FIG. 8. The lever part 251 may be held or fixed by a (not-shown) fixing apparatus, which is provided on the main body housing 101. Such a fixing apparatus optionally may be configured such that the lever part 251 is held by the engagement of an elastic hook or the like. The fixing apparatus may, alternately or in addition, comprise a magnet. The position shown in FIG. 8 corresponds to the stored position of the lever part 251.

(Third Embodiment)

Next, a third embodiment of the present disclosure will be explained with reference to FIG. 11 through FIG. 13. The third embodiment differs from the first embodiment principally in the configuration of cam lever mechanism 350. Consequently, constituent elements that are the same as those in the first embodiment have been assigned the same reference numbers, and explanations thereof are therefore omitted where they would be merely repetitive. That is, the description of the first and second embodiments is incorporated by reference into the description of the third embodiment to the extent that identical or substantially similar elements, functions, configurations, etc. are present in the third embodiment.

Figure 11:
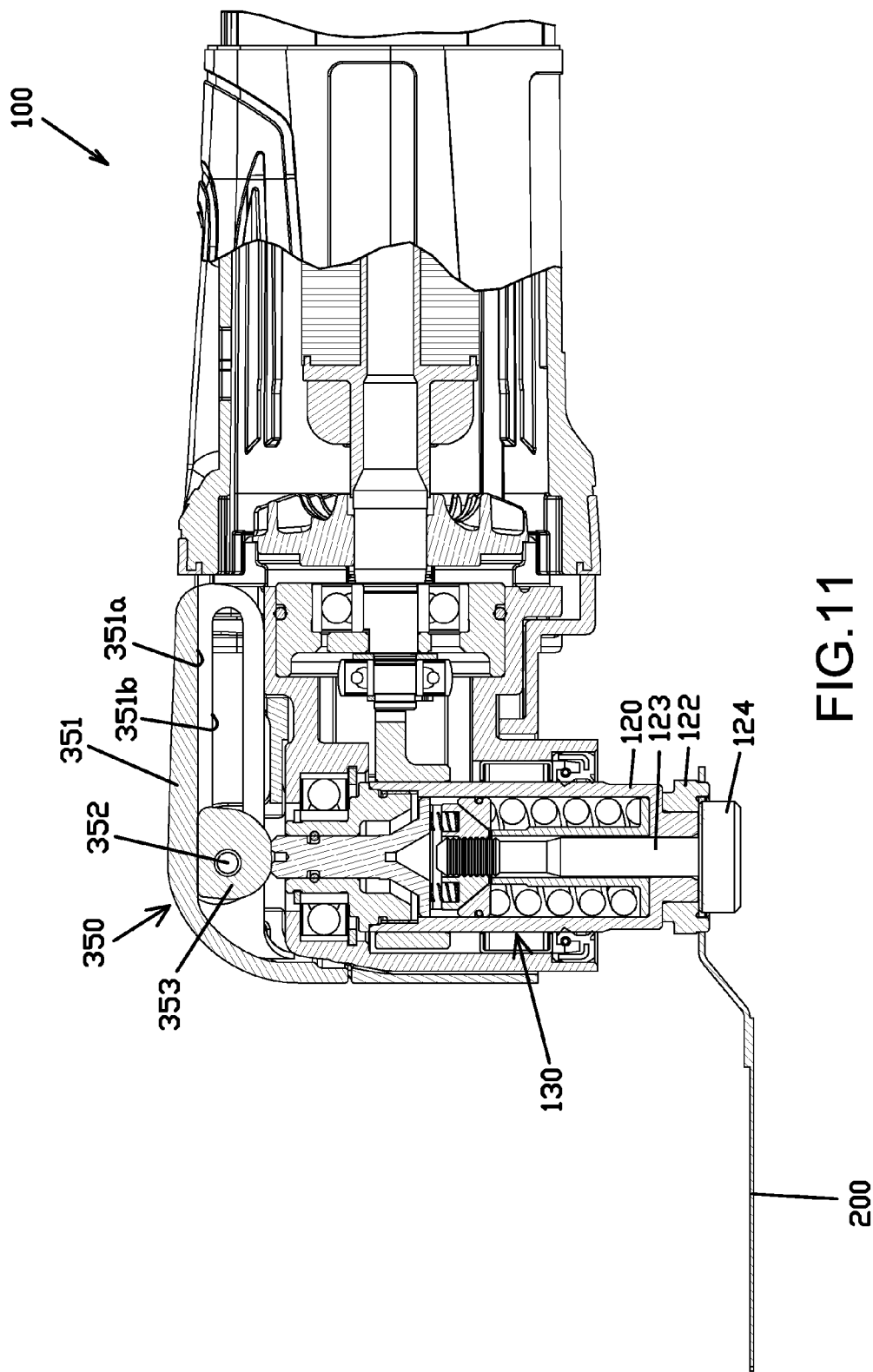
FIG. 11 is a partial cross sectional view of an oscillating multi-tool, including a cam lever, according to a third embodiment of the present disclosure.

As shown in FIG. 11, the cam lever mechanism 350 principally comprises a lever part (pivotable handle) 351, a pivot axle 352, and an eccentric part 353.

The lever part 351 comprises an eccentric part contact part 351*a* and a slide guide 351*b*. The eccentric part contact part 351*a* extends along the longitudinal direction of the lever part 351 and includes a surface that makes surface contact with the eccentric part 353. The slide guide 351*b* also extends along the longitudinal direction of the lever part 351 and defines a space through which the pivot axle 352 is movable. The lever part 351 is thus configured such that it can slide from its (rearward) position shown in FIG. 11 to its (forward) position shown in FIG. 12 (and vice versa) by causing the slide guide 351*b* to slide along and relative to the pivot axle 352 (which is disposed within the slide guide 351*b*). The lever part 351 is one exemplary, non-limiting embodiment of a "grasping part" according to the present invention. In addition, the position of the lever part 351 shown in FIG. 11 is one exemplary, non-limiting embodiment of a "third position" of the present disclosure, and the position of the lever part 351 shown in FIG. 12 is one exemplary, non-limiting embodiment of a "first position" of the present disclosure. In addition, the direction in which the lever part 351 slides relative to the pivot axle 352 is one exemplary, non-limiting embodiment of a "second direction" according to the present disclosure.

The eccentric part 353 is supported by the pivot axle 352, which is orthogonal to the longitudinal direction of the spindle 120 and is configured such that it is pivotable about the pivot axle 352. Pivoting the lever part 351 causes the eccentric part 353 to pivot about the pivot axle 352 from the (forward) position shown in FIG. 12 to the (vertical) position shown in FIG. 13. The pivot axle 352 is one exemplary, non-limiting embodiment of a "fulcrum" of the present disclosure. In addition, the position of the lever part 351 shown in FIG. 13 is one exemplary, non-limiting embodiment of a "second position" of the present disclosure. In addition, the pivot direction around the pivot axle 352 is one exemplary, non-limiting embodiment of a "first direction" of the present disclosure.

Figure 12:
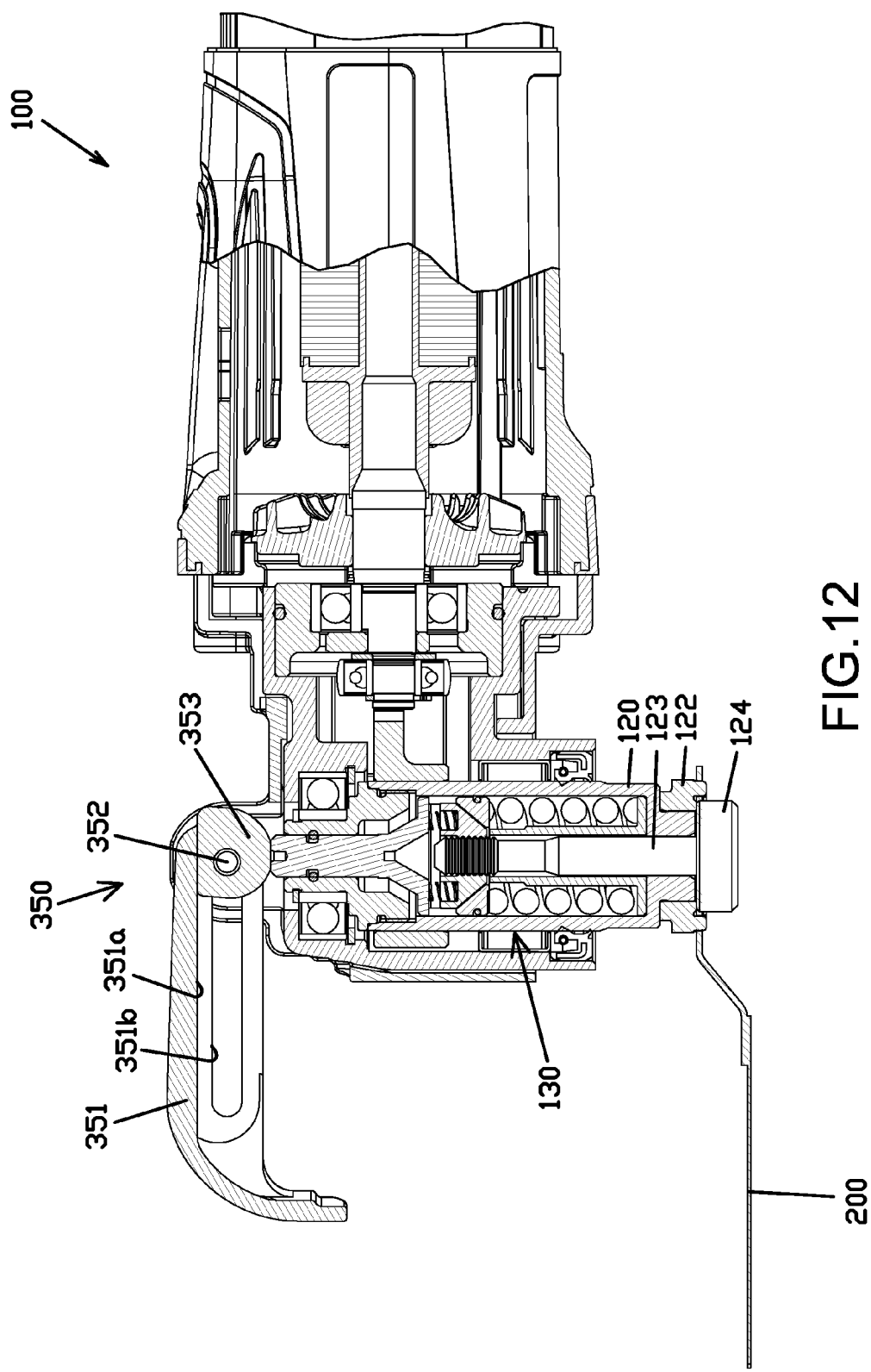
FIG. 12 is a cross sectional view of the multi-tool of FIG. 11 that shows the cam lever slid away from the position shown in FIG. 11.
Figure 13:
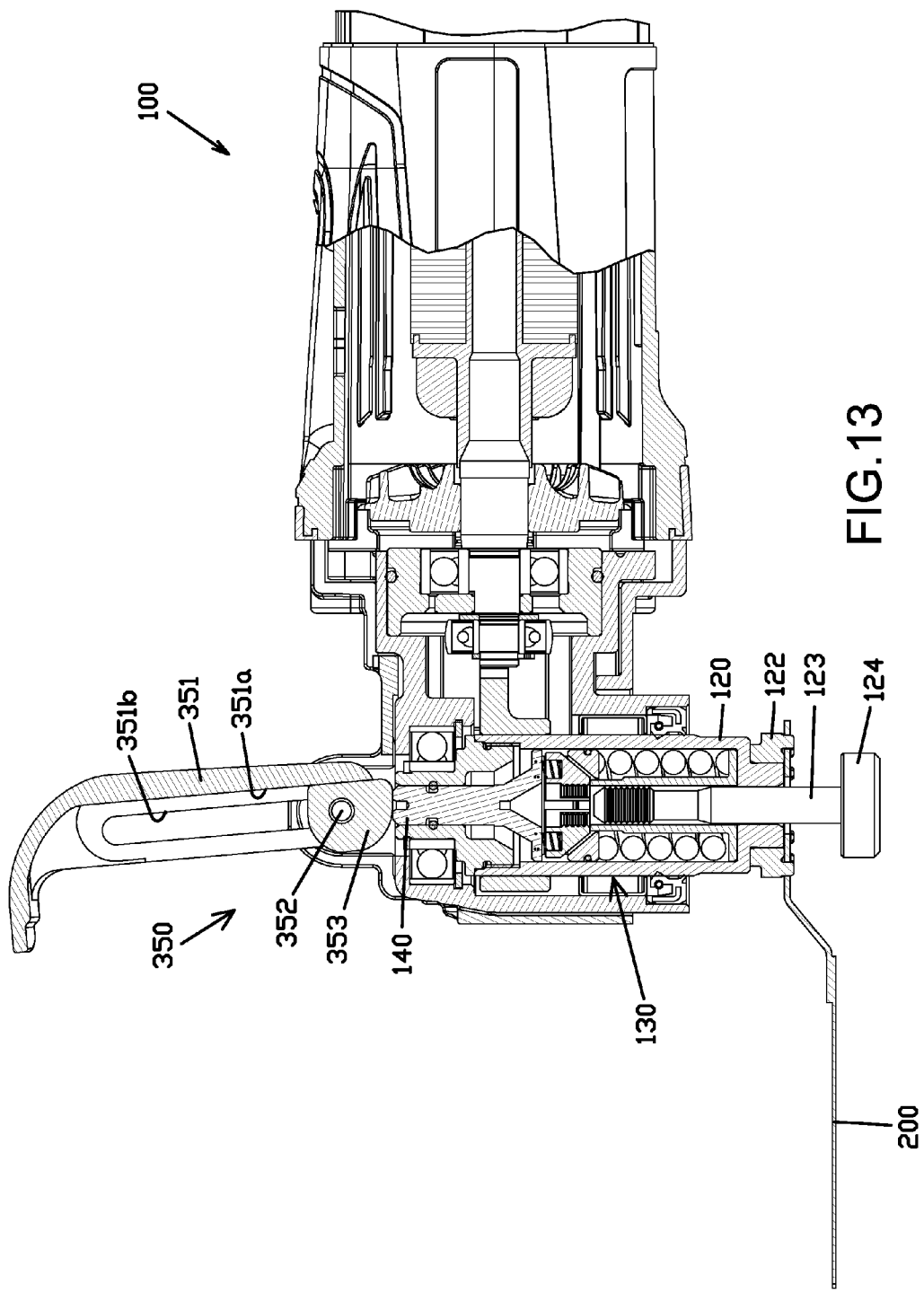
FIG. 13 is a cross sectional view of the multi-tool of FIG. 12 that shows the cam lever pivoted away from the position shown in FIG. 12.

In the third embodiment, pivoting the lever part 351 from the (forward) position shown in FIG. 12 to the (vertical) position shown in FIG. 13 causes the eccentric part contact part 351*a* and the eccentric part 353 to make surface contact, and consequently the eccentric part 353 pivots, thereby causing the thrust pin 140 to move downward. As a result, it becomes possible for the clamp shaft 123 to be removed (detached) from the spindle 120, and, by removing the clamp shaft 123, the blade 200 can be removed (detached). When mounting another blade 200 or another tool accessory, the lever part 351 is then pivoted from the (vertical) position shown in FIG. 13 to the (forward) position shown in FIG. 12. The operation of each of the constituent elements at this time is the same as in the first embodiment. The (forward) position shown in FIG. 12 and the (vertical) position shown in FIG. 13 correspond to the clamped position and the release position, respectively, according to the preceding embodiments. Namely, in the release position, a free end of the lever part 351 is spaced farther from the blade 200 than in the clamped position.

After the blade 200 has been mounted, the lever part 351 is slid from the (forward) position shown in FIG. 12 to the (rearward) position shown in FIG. 11, and thereby the lever part 351 is fixed or secured to the main body housing 101.

At this time, as in the first embodiment, at the position shown in FIG. 11, the lever part 351 is held by the protective rubber members 101*a* of the main body housing 101 and is thereby fixed or secured in its storage position. Furthermore, the lever part 351 may be fixed or retained by an optional (not shown) fixing apparatus that is provided on the main body housing 101. The fixing apparatus may optionally operate based upon a mechanical engagement, for example, an elastic hook, or by magnetic force, such as a magnet. The position shown in FIG. 11 corresponds to the stored position of the lever part 351.

According to each of the embodiments described above, the clamp shaft 123 can be attached and detached by pivoting the lever parts 151, 251, 351 of the cam lever mechanisms 150, 250, 350, respectively, and thereby the blade 200 can be attached and detached. Namely, the blade 200 can be attached and detached in a simple manner and without the use of any special tool.

In addition, according to each of the embodiments, when the blade 200 is to be removed (detached) from the power tool 100, the lever parts 151, 251, 351 are pivoted in the direction moving away from the blade 200, with the pivot axle 152, 252, 352, respectively, serving as the axis of rotation. Therefore, because the user's hand grasping the lever part 151, 251, 351 moves in the direction away from the blade 200 to perform this operation, the user can apply sufficient force to pivot the lever part without being concerned about slipping and having his/her hand inadvertently come into contact with the sharp blade 200.

In addition, according to each of the exemplary embodiments of the multi-tool 100, the blade 200 is interposingly held by the urging force of the coil spring 134; consequently, when the blade 200 is to be removed, the respective lever part 151, 251, 351 is moved against the urging force of the coil spring 134. Accordingly, a relatively large force is required to move the lever part 151, 251, 351 towards the release position. Nevertheless, according to each of the embodiments, because the force applied by the user's hand is directed away from the blade 200, the relative large force for moving the lever part 151, 251, 351 is not directed toward the blade 200, thereby improving the safety of the operation.

In addition, each of the lever parts 151, 251, 351 of the respective embodiments is fixed or secured to the main body housing 101 in the stored position. Accordingly, it is possible to prevent the lever parts 151, 251, 351 from being moved by the oscillations that act on the housing 101 when the multi-tool 100 is driven. Thus, in these embodiments, it is possible to more effectively and effectively prevent or suppress oscillations or vibrations (rattling) of the lever part 151, 251, 351, while being held by the main body housing 101, due to the adjacent elastic member in contact with the lever part 151, 251, 351.

In addition, in the second embodiment and the third embodiment, the direction in which the respective lever part 251, 351 moves when the blade 200 is being removed and the direction in which the lever part 251, 351 moves to the stored position are different. More specifically, by providing two different movement directions for operating (moving) the lever parts 251, 351, the lever parts 251, 351 can be operated more reliably and safely in accordance with the movement direction.

In the above-described embodiments, the clamp shaft 123 is held by the urging force of the coil spring 134, but the present invention is not limited thereto. For example, if the coil spring 134 is configured such that the clamp head 124 urges the clamp shaft 123 in the direction that approaches (i.e. towards) the flange 122, then it is not necessary to adopt a configuration in which the clamp shaft 123 is held by the urging force of the coil spring 134.

In addition, in the above-described embodiments, the clamp shaft holding mechanism 130 is configured such that the blade 200 is interposingly held between the clamp head 124 and the flange 122 by the urging force of the coil spring 134, but the present invention is not limited thereto. For example, a configuration may be adopted in which the blade 200 is interposingly held between the clamp head 124 and the flange 122 by the clamp shaft holding mechanism 130 coupling with the clamp shaft 123 by some other coupling method, such as by screwing.

In addition, in the above-described embodiments, the lever parts 151, 251, 351 move between the clamped position and the release position by the pivoting of the lever parts 151, 251, 351, but the present invention is not limited thereto. For example, the lever parts 151, 251, 351 may be configured so that they can each be slid between the clamped position and the release position.

In addition, the above-described embodiments, the coil spring 134 is used as the urging member, but the present invention is not limited thereto. For example, a disc spring may be used as the urging member. In this case, one disc spring may be used, or a plurality of disc springs may be stacked. In addition, another type of spring may be used as the urging member. In addition, if a member that generates a restoring force by elastic deformation is used as the urging member, then the member may be made of rubber, resin, or the like. Therefore, the urging member may be any type of material and/or structure that generates a resilient restoring force.

In addition, the above-described embodiments, the blade 200 is used as the exemplary tool accessory (tip tool), but the present invention is not limited thereto. For example, a variety of other tool accessories or attachments (tip tools) may be utilized with the present teachings, such as e.g., sanding pads, grinders, files, polishing pads, etc.

In addition, in the above-described embodiments, the multi-tool 100 serves as a representative power tool, but the present invention is not limited thereto. The present teachings can also be adapted to any other type of power tool as long as it is configured to hold the tool (tool accessory or tip tool) in an interposed, sandwiched or clamped manner. For example, power tools that rotate the tool, such as a grinder, a circular saw, or the like may also fall within the scope of the present invention.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools and arrangements for securing a tool (tool accessory) to a power tool, such as (without limitation) an oscillating multi-tool.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMERAL LIST

100 Oscillating multi-tool
101 Main body housing
101a Protective rubber member
102 Drive mechanism
103 Tool holding mechanism
110 Motor
111 Output shaft
112 Eccentric shaft
114 Driven arm
120 Spindle
121 Spindle extension member
122 Flange
123 Clamp shaft
124 Clamp head
125 Bearing
126 Bearing
130 Clamp shaft holding mechanism
131 Clamp members
131a Tilted surfaces
132 Ring shaped member
132a Tilted surface
133 O-ring
134 Coil spring
140 Thrust pin
141 Coil spring
142 O-ring
143 Ejector
150 Cam lever mechanism
151 Lever part
151a Recessed part
152 Pivot axle
153 Eccentric part
160 Switch
200 Blade
250 Cam lever mechanism
251 Lever part
252 Pivot axle
253 Eccentric part
254 Pivot axle
350 Cam lever mechanism
351 Lever part
351a Eccentric part contact part
351b Slide guide
352 Pivot axle
353 Eccentric part

We claim:
1. A power tool comprising:
a housing having a longitudinal centerline;
a clamp mechanism configured to interposingly hold a tool accessory, and an operating mechanism configured to operate the clamp mechanism, the power tool being configured to drive the tool accessory held by the clamp mechanism, wherein:

the operating mechanism comprises a pivotable lever configured to be grasped by an operator and pivoted relative to the housing, the pivotable lever having a length, a connected end and a free end disposed opposite of the connected end, the operating mechanism is configured such that the clamp mechanism operates by moving the pivotable lever to switch the operating mechanism between a first mode, in which the clamp mechanism interposingly holds the tool accessory, and a second mode, in which the tool accessory is removable, the power tool is configured to switch from the first mode to the second mode by moving the free end of the pivotable lever from a first side of the longitudinal centerline to a second, opposite, side of the longitudinal center line and toward a power switch of the power tool, the clamp mechanism comprises an urging member and is configured such that the tool accessory is interposingly held by an urging force of the urging member;

the operating mechanism is configured such that the clamp mechanism operates by moving the pivotable lever against the urging force to switch the operating mechanism from the first mode to the second mode;

the free end of the pivotable lever is movable between a first position on the first side of the longitudinal centerline and a second position on the second, opposite, side of the longitudinal centerline;

the operating mechanism is configured such that the clamp mechanism operates by moving the free end of the pivotable lever from the first position to the second position to switch the operating mechanism from the first mode to the second mode;

when the pivotable lever is located in the second position, the free end of the pivotable lever is a first distance from the tool accessory and when the pivotable lever is located in the first position, the free end of the pivotable lever is a second distance from the tool accessory, the first distance being greater than the second distance, the pivotable lever is pivotable about a fulcrum, when the free end of the pivotable lever is in the first position, the free end is located between the fulcrum and the tool accessory, when the free end of the pivotable lever is in the second position, the fulcrum is located between the free end and the tool accessory, and the free end of the pivotable lever is movable from the first position to a third position, which differs from the second position, and such that the pivotable lever is securable against the housing of a power tool at the third position by at least one elastic member configured to generate a lateral squeezing force on opposite side portions of the pivotable lever when the lever is in the third position.

\* \* \* \* \*